J. A. CRANDALL.
Velocipede.
No. 160,575.                         Patented March 9, 1875.
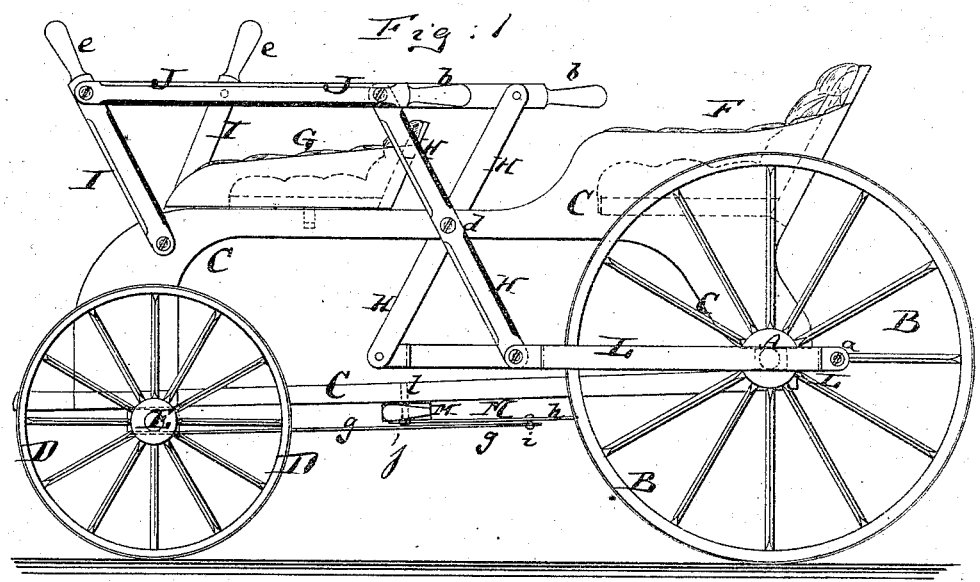
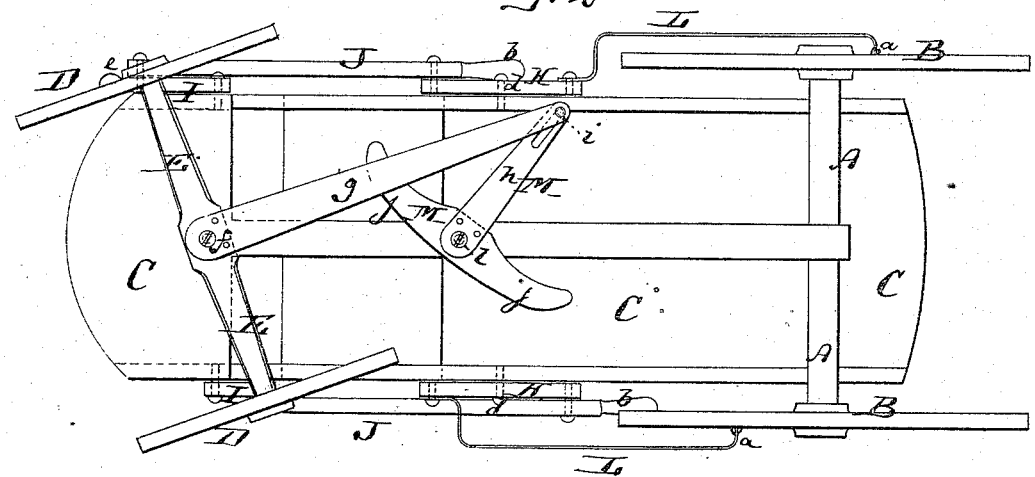
Witnesses:
A. Moraga.
E. C. Webb.
Inventor:
Jesse A. Crandall
by his attorney
A. v. Briesen

UNITED STATES PATENT OFFICE.

JESSE A. CRANDALL, OF BROOKLYN, NEW YORK.

IMPROVEMENT IN VELOCIPEDES.

Specification forming part of Letters Patent No. 160,575, dated March 9, 1875; application filed January 29, 1875.

*To all whom it may concern:*

Be it known that I, JESSE A. CRANDALL, of Brooklyn, in the county of Kings and State of New York, have invented a new and Improved Velocipede, of which the following is a specification:

Figure 1 is a side view, and Fig. 2 a bottom view, of my improved velocipede.

Similar letters of reference indicate corresponding parts in both figures.

This invention has for its object to so arrange the levers by which motion is imparted to a two-seat velocipede, that the occupants of both seats may apply their joint powers to the same cranks and wheels, and also to produce a steering mechanism of great simplicity.

The invention consists in the new arrangement of working-levers and of steering apparatus, hereinafter more fully described.

A in the drawing is the hind axle, and B B are the hind wheels of the velocipede. C is the body of the vehicle. D D are the front wheels, hung on the front axle E. The hind axle is rigidly connected with the frame or body C, and the wheels B B turn loose on it. The vehicle is propelled by the turning of the wheels B B by the occupant or occupants of one or both of the seats F and G of the vehicle. To this end, two levers, H and I, are pivoted to each side of the body C, and have their upper ends connected by a rod, J. The lower end of the lever H extends below its pivot, and connects by a rod, L, with a crank or wrist-pin, $a$, of the wheel B, all as shown in Fig. 1. The occupant of the rear seat F can readily grasp the upper end of the lever H or the back end of the rod J, shaped into a handle, $b$, and can, by vibrating the lever H on its pivot $d$, first on one side of the vehicle and then on the other, rotate the wheels B B, and propel the vehicle. The occupant of the front seat G may as easily grasp the front end of the rod J or the upper end of the lever I, shaped into a handle, $e$, and vibrate thereby the lever H, with like effect. Finally, both occupants may unite their efforts by application of their hands to the handles $b$ $b$ and $e$ $e$, for revolving the wheels B B.

The front axle E is in the middle pivoted by a bolt, $f$, to the body C, and has a backwardly-projecting arm, $g$, so that it has the form of the letter T, as clearly shown in Fig. 2. Behind the axle E is pivoted beneath the body C, another T-shaped lever, M, of which the backwardly-projecting arm $h$ is, by a pin, $i$, connected to the end of the arm, $g$, the pin $i$ passing through a slot in one of said arms. The cross-piece $j$ of the lever M serves as a foot-support and steering-lever for the occupant of the rear seat F, whose feet rest on the ends of said cross-piece $j$.

By turning the lever M on its pivot $l$ the axle E is also vibrated on its pivot, the arrangement of the lever connection serving to give a good purchase for easy steering.

I claim as my invention—

1. The combination of the levers H and I, handles $b$ and $e$, and rod J, with the rod L, crank-wheel B, and the two seats F and G of a velocipede, substantially as shown and described.

2. The pivoted T-shaped front axle E, combined with the T-shaped steering and foot lever M, and joined to such foot-lever behind its pivot, substantially as and for the purpose shown and described.

J. A. CRANDALL.

Witnesses:
  E. C. WEBB,
  A. MORAGA.